United States Patent
Lee et al.

(10) Patent No.: US 8,451,312 B2
(45) Date of Patent: May 28, 2013

(54) AUTOMATIC VIDEO STREAM SELECTION

(75) Inventors: Jae Han Lee, San Jose, CA (US);
E-Cheng Chang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 732 days.

(21) Appl. No.: 12/683,010

(22) Filed: Jan. 6, 2010

(65) Prior Publication Data

US 2011/0164105 A1 Jul. 7, 2011

(51) Int. Cl.
*H04N 7/14* (2006.01)
*H04M 1/00* (2006.01)
*G06F 15/16* (2006.01)

(52) U.S. Cl.
USPC ..... 348/14.02; 345/156; 345/158; 348/14.01; 348/46; 348/47; 348/207.99; 348/453; 455/556.1; 714/776; 715/863

(58) Field of Classification Search
USPC ............... 345/156, 158; 348/14.01, 14.02, 348/453, 46, 47, 207.99; 455/556.1; 714/776; 715/863
See application file for complete search history.

(56) References Cited

U.S. PATENT DOCUMENTS

| | | | | |
|---|---|---|---|---|
| 7,301,528 | B2 * | 11/2007 | Marvit et al. | 345/156 |
| 8,004,555 | B2 * | 8/2011 | Oswald et al. | 348/14.01 |
| 8,046,026 | B2 * | 10/2011 | Koh | 455/556.1 |
| 8,253,770 | B2 * | 8/2012 | Kurtz et al. | 348/14.01 |
| 8,330,821 | B2 * | 12/2012 | Lee | 348/207.99 |
| 2006/0139463 | A1 | 6/2006 | Heinonen | |
| 2007/0070204 | A1 | 3/2007 | Mentzer | |
| 2010/0138797 | A1 * | 6/2010 | Thorn | 715/863 |
| 2010/0165192 | A1 * | 7/2010 | Cheng et al. | 348/453 |
| 2011/0050569 | A1 * | 3/2011 | Marvit et al. | 345/158 |
| 2011/0063419 | A1 * | 3/2011 | Lee et al. | 348/47 |
| 2011/0066924 | A1 * | 3/2011 | Dorso et al. | 714/776 |
| 2011/0164105 | A1 * | 7/2011 | Lee et al. | 348/14.02 |
| 2012/0314033 | A1 * | 12/2012 | Lee et al. | 348/46 |

FOREIGN PATENT DOCUMENTS

| | | |
|---|---|---|
| CN | 101521696 | 9/2009 |
| JP | 2007312039 | 11/2007 |
| KR | 20020049391 | 6/2002 |

OTHER PUBLICATIONS

"Next Gen iPhone Alert! We Have Front Facing Camera Video iChat Rumor!", printed from theiphoneblog.com, (Apr. 7, 2009), 5 pages.

* cited by examiner

*Primary Examiner* — Gerald Gauthier
(74) *Attorney, Agent, or Firm* — Schwegman Lundberg & Woessner, P.A.

(57) ABSTRACT

A handheld communication device is used to capture video streams and generate a multiplexed video stream. The handheld communication device has at least two cameras facing in two opposite directions. The handheld communication device receives a first video stream and a second video stream simultaneously from the two cameras. The handheld communication device detects a speech activity of a person captured in the video streams. The speech activity may be detected from direction of sound or lip movement of the person. Based on the detection, the handheld communication device automatically switches between the first video stream and the second video stream to generate a multiplexed video stream. The multiplexed video stream interleaves segments of the first video stream and segments of the second video stream. Other embodiments are also described and claimed.

18 Claims, 6 Drawing Sheets

AUTOMATIC VIDEO STREAM SELECTION

FIELD

An embodiment of the invention relates to a handheld wireless communication device that can be used to capture videos. Other embodiments are also described.

BACKGROUND

Many handheld wireless communication devices provide video capturing capabilities. For example, most mobile phones that are in use today include a camera for capturing still images and videos. A user can record a video session or conduct a live video call using the mobile phone.

Some handheld communication devices may include multiple cameras that can simultaneously capture multiple video streams. A user of such a device can use the multiple cameras to simultaneously capture multiple different video streams, for example, one of the face of the user himself behind the device, and another of people in front of the device. However, if the user attempts to transmit the multiple video streams to another party during a live video (teleconference) call, the bandwidth for transmitting the multiple video streams may exceed the available bandwidth. Alternatively, the user may first upload the video streams to a computer after the teleconference ends, and then edit the video streams to generate a single video stream. However, the user might not have access to a computer that has video editing capabilities.

SUMMARY

An embodiment of the invention is directed to a handheld wireless communication device that has at least two cameras facing in opposite directions. The device receives a first video stream and a second video stream simultaneously from the two cameras. The device detects a speech activity of a person who is captured in the video streams by detecting the direction of sound or lip movement of the person. Based on the detection, the device automatically switches between the first video stream and the second video stream to generate a multiplexed video stream. The multiplexed video stream contains interleaving segments of the first video stream and the second video stream.

In one embodiment, the device detects the speech of a person by detecting the direction of sound. The device may include more than one microphone for detecting the direction of sound. A first microphone may point to the same direction to which one camera points, and a second microphone may point to the same direction to which the other camera points. Based on the direction of sound, the device automatically switches between the first video stream and the second video stream to generate a multiplexed video stream in which the video is, in a sense, "synchronized" to the speaker.

In another embodiment, the device detects the speech of a person by detecting the lip movement of the person. The device may include an image analyzer for analyzing the images in the video streams. Based on the lip movement, the device automatically switches between the first video stream and the second video stream to generate a multiplexed video stream.

In one embodiment, the multiplexed video stream may be transmitted to a far-end party by an uplink channel of a live video call. In another embodiment, the multiplexed video stream may be stored in the memory of the handheld communication device for viewing at a later time.

The handheld communication device may be configured or programmed by its user to support one or more of the above-described features.

The above summary does not include an exhaustive list of all aspects of embodiments of the present invention. It is contemplated that embodiments of the invention include all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to an or "one" embodiment of the invention in this disclosure are not necessarily to the same embodiment, and they mean at least one.

DETAILED DESCRIPTION

Figure 1:
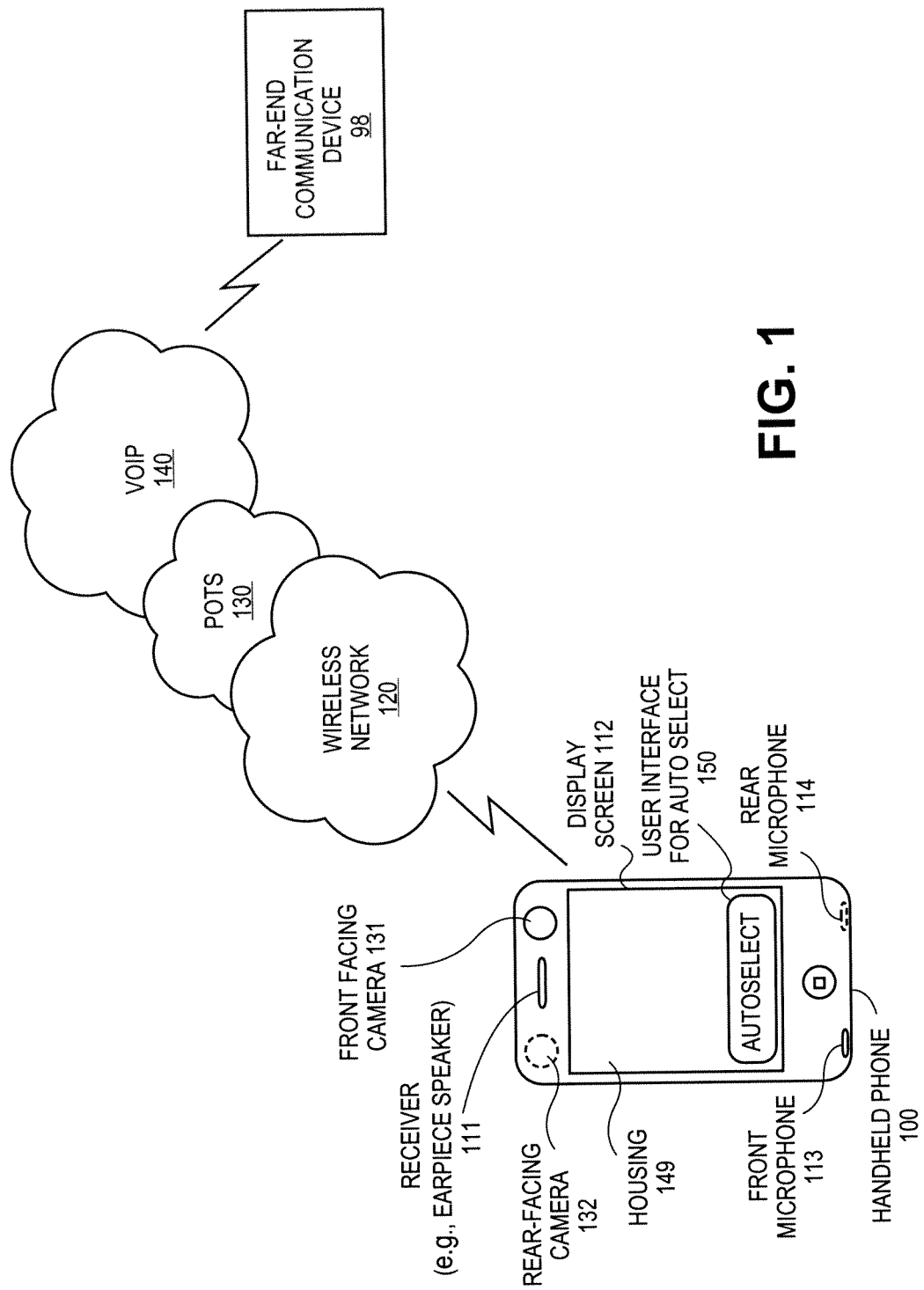
FIG. 1 is a diagram of a handheld communication device in accordance with an embodiment of the invention.

FIG. 1 is a diagram illustrating a communication environment in which an embodiment of the invention as an automatic video selection process that produces a multiplexed video stream can be practiced, using a handheld phone 100. The term "phone" herein broadly refers to various two-way, real-time communication devices, e.g., landline plain-old-telephone system (POTS) end stations, voice-over-IP end stations, cellular handsets, smart phones, personal digital assistant (PDA) devices, etc. In one embodiment, the handheld phone 100 can support a two-way, real-time mobile or wireless connection. For example, the handheld phone 100 can be a mobile phone or a mobile multi-functional device that can both send and receive the uplink and downlink video signals for a video call. In other embodiments, the automatic video selection process can be practiced in a handheld communication device that does not support such a live, two-way video call; such a device could however support uploading of the multiplexed video stream to, for example, a server or a desktop computer.

The handheld phone 100 communicates with a far-end phone 98 over one or more connected communication networks, for example, a wireless network 120, POTS network 130, and a VOIP network 140. Communications between the handheld phone 100 and the wireless network 120 may be in accordance with known cellular telephone communication network protocols including, for example, global system for mobile communications (GSM), enhanced data rate for GSM evolution (EDGE), and worldwide interoperability for microwave access (WiMAX). The handheld phone 100 may also have a subscriber identity module (SIM) card, which is a detachable smart card that contains the subscription information of its user, and may also contain a contacts list of the user. The user may own the handheld phone 100 or may otherwise be its primary user. The handheld phone 100 may be assigned a unique address by a wireless or wireline telephony network operator, or an Internet Service Provider (ISP). For example, the unique address may be a domestic or international telephone number, an Interne Protocol (IP) address, or other unique identifier.

The exterior of the handheld phone 100 is made of a housing 149 within which are integrated several components including a display screen 112, a receiver 111 (an earpiece speaker for generating sound) and one or more microphones (e.g., a mouthpiece for picking up sound, in particular when the user is talking). In one embodiment, the handheld phone 100 includes a front microphone 113 and a rear microphone 114, each receiving sounds from a different direction (e.g., front and back). The handheld phone 100 may also include a front-facing camera 131 and a rear-facing camera 132 integrated within the front face and the back face of the housing 149, respectively. Each camera 131, 132 capable of capturing still image and video from a different direction (e.g., front and back). In this embodiment, the camera 131 faces the same direction from which the microphone 113 receives sound, and the camera 132 faces the same direction from which the microphone 114 receives sound. In one embodiment, the cameras 131 and 132 may be facing in two different directions that are not necessarily the front and the back faces of the phone; for example, one camera may face the left and the other camera may face the right. In another embodiment, the cameras 131 and 132 may be facing in two different directions that are not necessarily opposite directions; for example, one camera may face the front and the other camera may face the right. The videos and sounds captured by the handheld phone 100 may be stored internally in the memory of the handheld phone 100 for viewing at a later time, or transmitted in real-time to the far-end phone 98 during a video call.

The handheld phone 100 also includes a user input interface for receiving user input. In one embodiment, the user input interface includes an "Auto-Select" indicator 150, which may be a physical button or a virtual button. The physical button may be a dedicated "Auto-Select" button, or one that is shared with other or more functions such as volume control, or a button identified by the text shown on the display screen 112 (e.g., "press ## to activate Auto-Select"). In an embodiment where the "Auto-Select" indicator 150 is a virtual button, the virtual button may be implemented on a touch-sensing panel that includes sensors to detect touch and motion of the user's finger. In one embodiment, the touch-sensing panel can be embedded within the display screen 112, e.g., as part of a touch sensor. In an alternative embodiment, the touch-sensing panel can be separate from the display screen 112, and can be used by the user to direct a pointer on the display screen 112 to select a graphical "Auto-Select" button shown on the display screen 112.

In one embodiment, when the handheld phone starts a video capturing session, a user can select (e.g., press) the "Auto-Select" indicator 150 to activate an "Auto-Select" feature. By activating the "Auto-Select" feature, the handheld phone 100 can automatically switch between the two video streams that are simultaneously captured by the two cameras 131 and 132 to generate a multiplexed output. The term "video stream" herein refers to a sequence of video frames including images and sound. The multiplexed output may include interleaving segments of the video streams captured by the front-facing camera 131 and the rear-facing camera 132. The automatic switching operation may be triggered by having detected that a person whose image is captured in the video is talking. This detection of speech can be achieved by audio processing of captured sound to detect whether the person is speaking, or image processing of captured image to detect the lip movement of the person.

Turning to the far-end phone 98, the far-end phone 98 may be a mobile device or a land-based device that is coupled to a telephony network or other communication networks through wires or cables. The far-end phone 98 may be identified with a unique address, such as a telephone number within the public switched telephone network. The far-end phone 98 may also have an Internet protocol (IP) address if it performs calls through a voice over IP (VOIP) protocol. The far-end phone 98 may be a cellular handset, a plain old telephone service (POTS), analog telephone, a VOIP telephone station, or a desktop or notebook computer running telephony or other communication software. The far-end phone 98 has the capabilities to view videos captured by and transmitted from the handheld phone 100.

Figure 2:
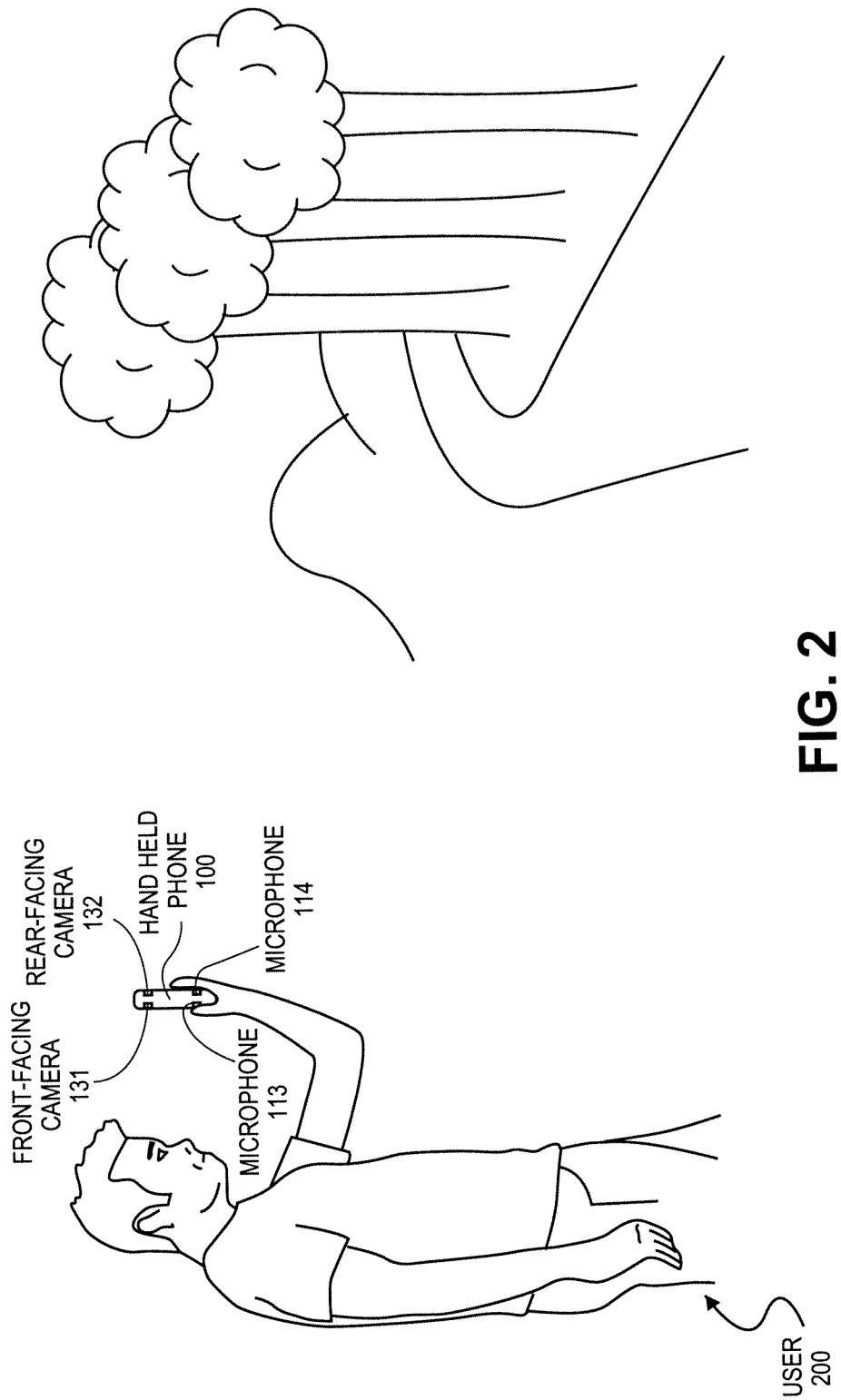
FIG. 2 is an example illustrating the use of the handheld communication device in a report mode.

FIG. 2 is a diagram illustrating a scenario in which a user 200 may activate the auto-select feature of the handheld phone 100 in a report mode. The user 200 may hold the handheld phone 100 in an upright position, such that the front-facing camera 131 faces the user 200 and the rear-facing camera 132 faces a scene that the user wishes to capture in a video. The user 200 may start a video capturing session that turns on both the front-facing camera 131 and the rear-facing camera 132. The user 200 may then activate the auto-select feature of the handheld phone 100, which enables the handheld phone 100 to automatically switch between the two simultaneously captured video streams. The handheld phone 100 then generates a multiplex video stream for internal storage (e.g., for video recording) or for real-time transmission (e.g., for making a video call). In the report mode, the multiplex video stream may include segments of the user 200 whenever he speaks, and segments of the scene whenever he does not speak. That is, the video switching operation may be triggered when the speech of the user 300 is detected. The two video streams may be interleaved throughout the multiplex video stream.

In the report mode, the handheld phone 100 may use the front microphone 113, or both the microphones 113 and 114, to detect the sound of the user 200. Whenever a sound is detected in the user's direction, the handheld phone 100 automatically switches to the video stream captured by the front-facing camera 131. In another embodiment, the handheld phone 100 may use image processing techniques to detect lip movement of the user 300. The lip movement can be used to identify the occurrence of the user's speech. The handheld phone 100 can automatically switch to the video stream containing the image of the user 300 upon detection of the user's lip movement, and can automatically switch to the video stream containing the scene when the user's lip movement is not detected.

Figure 3:
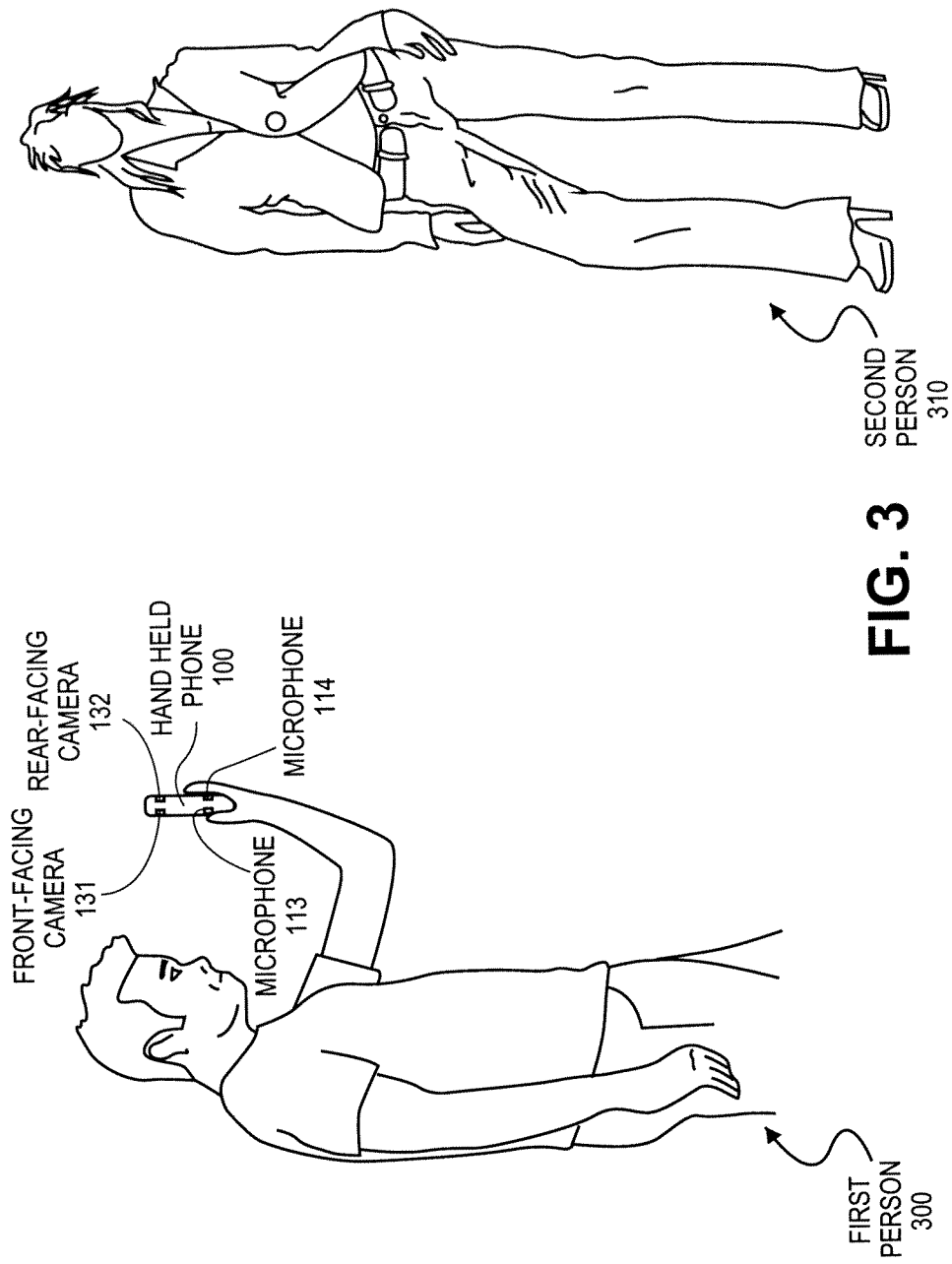
FIG. 3 is an example illustrating the use of the handheld communication device in an interview mode.

FIG. 3 is a diagram illustrating a scenario in which a first person 300 may activate the auto-select feature of the handheld phone 100 in an interview mode. The interview mode can be used when a person is recording a conversation with another person. The interview mode can also be used when there are several people participating in a video conference at the near-end of the handheld phone 100 with far-end users. The handheld phone 100 may be held in an upright position, such that the front-facing camera 131 faces the first person 300 and the rear-facing camera 132 faces a second person 310. The first person 300 may start a video capturing session that turns on both the front-facing camera 131 and the rear-facing camera 132. The first person 300 may then activate the auto-select feature of the handheld phone 100, which enables the handheld phone 100 to automatically switch between the two simultaneously captured video streams. The handheld phone 100 generates a multiplex video stream for internal storage (e.g., for video recording) or for real-time transmission (e.g., for making a video call). In the interview mode, the multiplex video stream may include segments of the first person 300 whenever he speaks, and segments of the second person 310 whenever she speaks. That is, the video switching operation may be triggered based on detected speech. The two video streams may be interleaved throughout the multiplex video stream.

In the interview mode, the handheld phone 100 may use both of the two microphones 113 and 114 to detect the direction of sound, and to switch to the video stream facing the direction of the detected sound. In another embodiment, the handheld phone 100 may use image processing techniques to detect lip movement of the first person 300 and the second person 310. The lip movement can be used to identify the occurrence of speech. The handheld phone 100 can automatically switch to the video stream containing the image of the first person 300 upon detection of the first person's lip movement, and automatically switch to the video stream containing the second person 310 upon detection of the second person's lip movement.

In an alternative embodiment, the handheld phone 100 may also include a manual option that allows the user of the handheld phone 100 to manually select the first video stream or the second video stream for storage or transmission. The handheld phone 100 may switch between the manual option and the automatic option as directed by the user.

Figure 4:
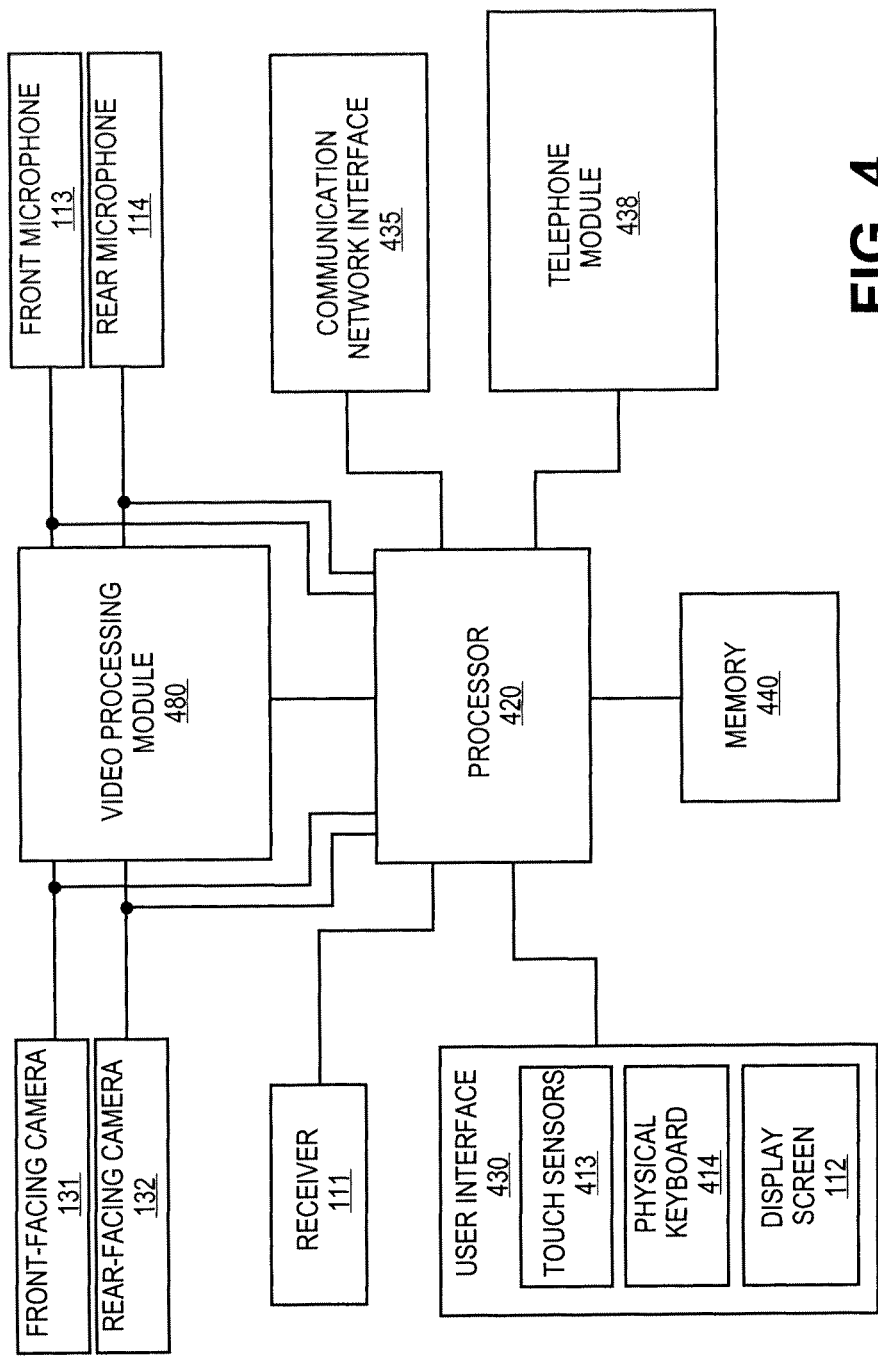
FIG. 4 is a diagram of functional unit blocks in the handheld communication device that provide video capture, selection and transmission capabilities.

FIG. 4 is a block diagram illustrating an embodiment of the handheld phone 100. The handheld phone 100 includes a communication network interface 435 for receiving and transmitting communication signals, e.g., audio, video and/or data signals. The handheld phone 100 also includes the receiver 111 for generating audio signals and the microphones 113 and 114 for picking up sound. The handheld phone 100 also includes a user interface 430. The user interface 430 includes the display screen 112 and touch sensors 413 for sensing the user's touch and motion. The handheld phone 100 may include a physical keyboard 414 for receiving keystrokes input from the user, or a virtual keyboard implemented by the touch sensors 413. The touch sensors 413 may be based on resistive sensing, capacitive sensing, optical sensing, force sensing, surface acoustic wave sensing, and/or other sensing techniques. The coordinates of the touch sensors 413 that respond to the user's touch and motion represent a specific user input. The touch sensors 413 may be embedded in the display screen 112, or may be embedded in a touch-sensing panel separate from the display screen 112.

In one embodiment, the handheld phone 100 also includes a telephone module 438 which is responsible for coordinating various tasks involved in a phone call. The telephone module 438 may be implemented with hardware circuitry, or may be implemented with one or more pieces of software or firmware that are stored within memory 440 in the handheld phone 100 and executed by the processor 420. Although one processor 420 is shown, it is understood that any number of processors or data processing elements may be included in the handheld phone 100. The telephone module 438 coordinates tasks such as receiving an incoming call signal, placing an outgoing call and activating video processing for a video call.

In one embodiment, the handheld phone 100 also includes a video processing module 480 for receiving input from the cameras 131 and 132, and microphones 113 and 114. The video processing module 480 processes the input to generate a multiplexed video stream for internal storage in the memory 440 or for transmission via the communication network interface 435. The video processing module 480 may be implemented with hardware circuitry, or may be implemented with one or more pieces of software or firmware that are stored within the memory 440 and executed by the processor 420. The video processing module 480 will be described in greater detail with reference to FIG. 5.

Additional circuitry, including a combination of hardware circuitry and software, can be included to obtain the needed functionality described herein. These are not described in detail as they would be readily apparent to those of ordinary skill in the art of mobile phone circuits and software.

Figure 5:
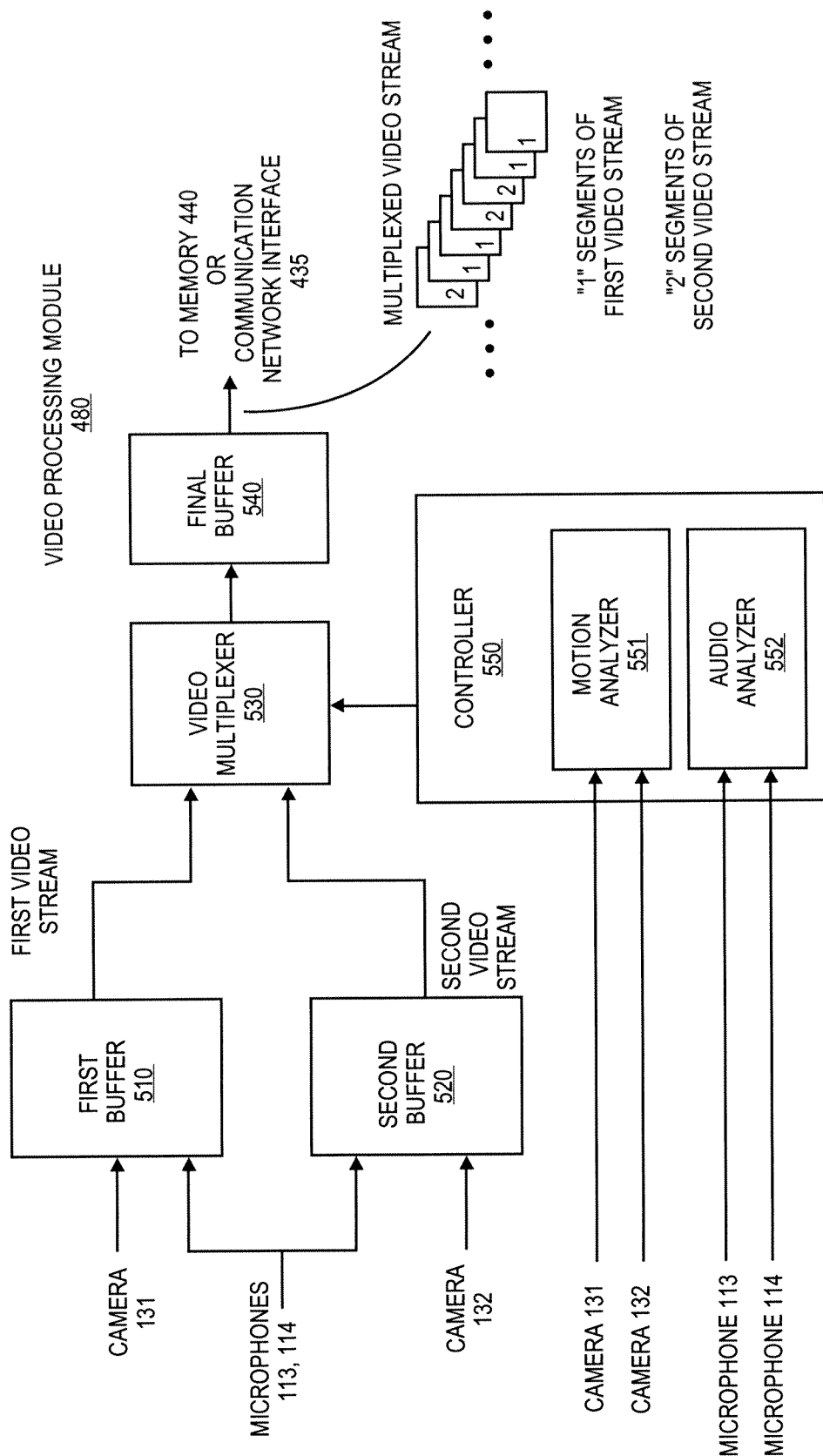
FIG. 5 is a block diagram of a video processing module in the handheld communication device.

FIG. 5 is a block diagram illustrating an embodiment of the video processing module 480. The video processing module 480 includes a first buffer 510 and a second buffer 520 to temporarily buffer a first video stream and a second video stream, respectively. The first video stream contains the images captured by the front-facing camera 131 and the sound captured by the microphones 113 and 114. The second video stream contains the images captured by the rear-facing camera 132 and the sound captured by the microphones 113 and 114. The two video streams enter a video multiplexer 530, which selects one of the video streams to generate a multiplexed output. Operation of the video multiplexer 530 is controlled by a controller 550.

The controller 550 may include one or both of a motion analyzer 551 and an audio analyzer 552. A user can enable one or both of the motion analyzer 551 and the audio analyzer 552. The motion analyzer 551 analyzes the images captured by the cameras 131 and 132 to detect lip movement of a person whose facial image is captured in the video. In an alternative embodiment, the motion analyzer 551 may receive the two video streams from the output of the first buffer 510 and the second buffer 520, and analyze the images of the face of a person captured in each video frame of the two video streams to detect lip movement. Techniques for detecting lip movement from facial images of a person are known in the art and, therefore, are not described herein. If the motion analyzer 551 is enabled, the controller 550 will generate a control signal to direct the output of the video multiplexer 530 based on detected lip movement. In one scenario, the first video stream may contain the image of a first person and the second video stream may contain the image of a second person. The controller 550 generates an output indicating the detected lip movement. According to the output of the controller 550, the video multiplexer 530 selects the first video stream when lip movement of the first person is detected, and selects the second video stream when lip movement of the second person is detected. In one embodiment, the video multiplexer 530 may maintain the current selection without switching when lip movement is detected in both video streams, or is not detected in either video stream.

The audio analyzer 552 analyzes the audio signals from the microphones 113 and 114 to detect the presence of speech and the direction of speech. In an alternative embodiment, the audio analyzer 552 may receive the two video streams from the output of the first buffer 510 and the second buffer 520, and analyze the audio signals in the two video streams to detect direction of sound. In one embodiment, the audio analyzer 552 may compare the strength of audio signals captured from the two microphones 113 and 114 to determine the direction of speech. A stronger audio signal from the front microphone 113 may indicate that a first person facing the front-facing camera 131 is talking, and a stronger audio signal from the rear microphone 114 may indicate that a second person facing the rear-facing camera 132 is talking. The controller 550 generates an output indicating the detected speech. According to the output of the controller 550, the video multiplexer 530 selects the first video stream when sound is detected from the first person, and selects the second video stream when sound is detected from the second person. In one embodiment, the video multiplexer 530 may maintain the current selection without switching when sounds of equal strength are detected from both microphones 113 and 114.

In one embodiment, the handheld phone 100 can be configured by the user to enable both of the motion analyzer 551 and the audio analyzer 552. For example, the motion analyzer 551 may be enabled in a noisy environment where it is difficult to analyze the direction of sound. The audio analyzer 552 may be enabled in an environment where the image quality is poor (e.g., when the image is unstable and/or dark). When a video is captured in an environment where the sound and image quality may be unpredictable, both the motion analyzer 551 and the audio analyzer 552 can be enabled. The combined results from the motion analyzer 551 and the audio analyzer 552 can be used to direct the switching of the video multiplexer 530. For example, the handheld phone 100 may detect a speech activity of a person when both lip movement of the person and sounds from the direction of the person are detected. Speech detection based on both lip movement and sound can prevent or reduce false detections. For example, a person may move his mouth but does not speak (e.g., when making a silent yawn), or a person may be silent but a background noise in the person's direction may be heard.

The multiplexed video stream generated by the video multiplexer 530 may pass through a final buffer 540 to be stored in memory 440 or transmitted via the communication network interface 430. In one embodiment, the multiplexed video stream includes segments of the first video streams interleaved with segments of the second video stream.

In an alternative embodiment, the handheld phone 100 may provide a "picture-in-picture" feature, which can be activated by a user. When the feature is activated, the video stream of interest can be shown on the entire area of the display screen 112, while the other video stream can be shown in a thumb-nail sized area at a corner of the display screen 112. For example, in the interview mode, the image of the talking person can be shown on the entire area of the display screen 112, while the image of the non-talking person can be shown in a thumb-nail sized area at a corner of the display screen 112. The multiplexed video stream includes interleaving segments of the first video stream and segments of the second video stream, with each frame of the multiplexed video stream containing "a picture in a picture," in which a small image from one video stream is superimposed on a large image from another vide stream.

In an embodiment where a manual option is provided by the handheld phone 100, selection of the manual option will disable the control signal from the controller 550. Instead, the video multiplexer 530 generates the multiplexed video stream based on the user's manual selection of either the first video stream or the second video stream.

Figure 6:
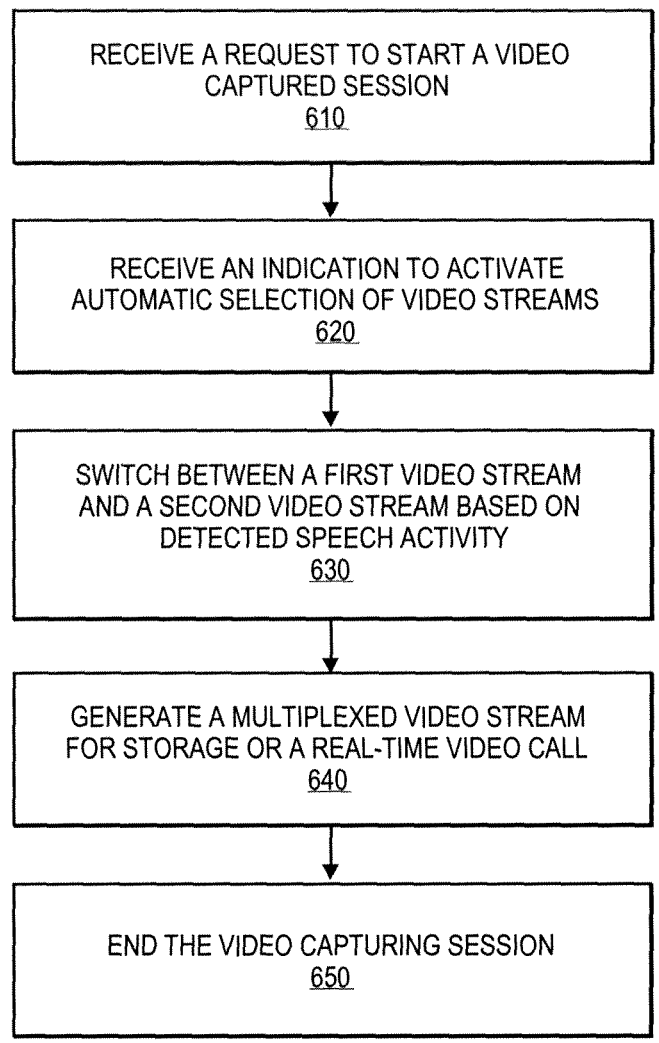
FIG. 6 is a flow chart illustrating an embodiment of a method for automatic video selection.

FIG. 6 is a flowchart that illustrates an embodiment of a method for operating the handheld phone 100 to perform automatic video stream selection. Referring to FIG. 6, operation may begin when the handheld phone 100 receives a request to start a video capturing session with the handheld phone 100 (610). The request may originate from a near-end user who is holding the handheld phone 100 (e.g., when the near-end user initiates a video call, or when the near-end user starts recording a video), or may originate from a far-end user who sends a video call request to the near-end user. The handheld phone 100 may then receive an indication from the near-end user to activate the automatic selection of video streams (620). In one embodiment, the near-end user may activate the "Auto-Select" indicator 150 of FIG. 1 at the beginning or during the video capturing session. In an alternative embodiment, the near-end user may pre-configure the handheld phone 100 to activate the auto-select feature before the start of the video capturing session.

With the activation of the auto-select feature, the handheld phone 100 starts the video capture session for a real-time video call or for video recording. The handheld phone 100 automatically switches between a first video stream containing images captured by the front-facing camera 131 and a second video stream containing images captured by the rear-facing camera 132 (630). The handheld phone 100 may display, at the same time as the video is being captured, a subject of interest on the display screen 112. The "subject of interest" may be a talking person, a scene, or other objects, and may change from time to time depending on whether a speech activity is detected in the captured video streams. As described above, the speech activities may be detected from the direction of sound or from lip movement of a person whose image is captured in the video streams.

The handheld phone 100 generates a continuous stream of multiplexed video stream from the first video stream and the second video stream (640). The video stream chosen as the multiplexed video stream is herein referred to as a "current video stream." At the beginning, the multiplexed video stream may start with a default video stream, which can be configured as either the first video stream or the second video stream. In one embodiment, when no speech activity is detected in the current video stream and speech activity is detected in the other video stream, the handheld phone 100 switches the multiplexed video stream to the other video stream. In an alternative embodiment, the handheld phone 100 may switch the multiplexed video stream to the other video stream upon detecting a speech activity in the other video stream, regardless of whether there is speech activity in the current video stream or not.

In one embodiment, a user of the handheld phone 100 may change the video selection between an automatic option and a manual option. When the manual option is selected, the user may manually select one of the two video streams to generate the multiplexed video stream.

The handheld phone 100 continues generating the multiplexed video stream until the video capturing session ends (650). If the video was captured for a video call, the video call may terminate when the video capturing session ends.

Although the handheld phone 100 is shown in FIGS. 1-3 as a mobile phone, it is understood that other communication devices can also be used.

In general, the handheld phone 100 (e.g., the telephone module 438 and the video processing module 480 of FIG. 4) may be configured or programmed by the user to support one or more of the above-described features.

To conclude, various ways of automatically selecting video streams using a communication device (e.g., a handheld communication device, mobile phone etc.) have been described. These techniques render a more user-friendly phone hold process for the user of a receiving phone. As explained above, an embodiment of the invention may be a machine-readable storage medium (such as memory 240) having stored thereon instructions which program a processor to perform some of the operations described above. In other embodiments, some of these operations might be performed by specific hardware components that contain hardwired logic. Those operations might alternatively be performed by any combination of programmed data processing components and custom hardware components.

The invention is not limited to the specific embodiments described above. Accordingly, other embodiments are within the scope of the claims.

What is claimed is:

1. A method comprising:
   receiving a first video stream and a second video stream simultaneously from two cameras of a handheld communication device, respectively, the two cameras facing opposite directions;
   detecting a speech activity of a person captured in one of the first and the second video streams, by detecting at least one of (a) sound coming from one of the two opposite directions with at least two microphones that point to different directions, and (b) through image processing of lip movement of the person; and
   based on detection of the speech activity, automatically switching between the first video stream and the second video stream to generate a multiplexed video stream.

2. The method of claim 1, wherein the detecting a speech activity of a person comprises:
   analyzing an image of the face of the person captured in said one of the first and second video streams to detect the lip movement.

3. The method of claim 1, further comprising:
   transmitting the multiplexed video stream to a far-end communication device during a real-time video call between the handheld communication device and the far-end communication device.

4. The method of claim 1, further comprising:
   storing the multiplexed video stream in a memory of the handheld communication device for playback after completion of a video capturing session.

5. The method of claim 1, wherein generating the multiplexed video stream includes interleaving segments of the first video stream and segments of the second video stream in response to a stronger audio signal from one of the at least two microphones.

6. The method of claim 1, wherein generating the multiplexed video stream includes interleaving video frames of the first video stream and the second video stream, with each video frame containing a picture in a picture, in which a small image from one video stream is superimposed on a large image from another video stream, wherein the large image is selected in response to the detection of the speech activity.

7. The method of claim 1, wherein one of the two cameras is integrated with a front face of the handheld communication device, and the other of the two cameras is integrated within a back face of the handheld communication device.

8. A handheld communication device, comprising:
   a first camera that faces a first direction to capture a first video stream;
   a second camera that faces a second direction to capture a second video stream simultaneously with the capture of the first video stream;
   two or more microphones that point to different directions;
   a single housing having a front face within which the first camera is integrated and a back face within which the second camera is integrated;
   a controller to select video frames from the first video stream when a sound is detected from the first direction, and to select video frames from the second video stream when a sound is detected from the second direction;
   an audio analyzer coupled to the two or more microphones to determine a direction of speech signals received by the handheld communication device, and to provide the direction to the controller for selection of the video frames from the first video stream and the second video stream; and
   a multiplexer to switch between the first video stream and the second video stream according to selection made by the controller and to generate a multiplexed video stream.

9. The handheld communication device of claim 8, further comprising:
   a buffer to store a partial segment of the multiplexed video stream as the multiplexed video stream is generated; and
   a communication interface to transmit the partial segment to a far-end communication device via a communication network during a real-time video call.

10. The handheld communication device of claim 8, further comprising:
    a communication interface capable of making and answering a phone call via a communication network.

11. A handheld communication device, comprising:
    a first camera to capture a first video stream;
    a second camera to capture a second video stream simultaneously with the capture of the first video stream;
    a single housing having a front face within which the first camera is integrated and a back face within which the second camera is integrated;
    a controller to select video frames from the first video stream and the second video stream based on detection of lip movement in an image of the face of a person captured in the video frames; and
    a multiplexer to switch between the first video stream and the second video stream according to selection made by the controller and to generate a multiplexed video stream.

12. The handheld communication device of claim 11, further comprising:
    a motion analyzer to detect the lip movement from the image of the face of the person, and to provide detection results to the controller for selection of the video frames from the first video stream and the second video stream.

13. An article of manufacture comprising machine-readable storage medium having stored therein instructions that program a handheld communication device to
    receive a first video stream from a first camera that faces a first person in a first direction, and simultaneously, a second video stream from a second camera that faces a second person in a second direction, the first camera and the second camera integrated within a front face and a back face of a single housing of the handheld communication device, respectively;
    automatically select the first video stream in response to a first speech activity of the first person is detected, and select the second video stream in response to a second speech activity of the second person is detected;
    generate a multiplexed video stream that includes the selected video stream.

14. The article of manufacture of claim 13, wherein the instructions further program the communication device to
    analyze video frames in the first video stream and the second video stream to detect lip movement of the first person and the second person.

15. The article of manufacture of claim 13, wherein the instructions further program the communication device to
    maintain the selected video stream without switching when the first speech activity and the second speech activity is detected from both of the first person and the second person.

16. The article of manufacture of claim 13, wherein the instructions further program the communication device to
    transmit the multiplexed video stream from the handheld communication device to a far-end communication device during a real-time video call between the handheld communication device and the far-end communication device.

17. The article of manufacture of claim 13, wherein the instructions further program the communication device to
    store the multiplexed video stream in a memory of the handheld communication device for playback after completion of a video capturing session.

18. The article of manufacture of claim 13, wherein the instructions further program the communication device to
    compare a strength of audio signals from two microphones on the handheld communication device to determine a direction of the first speech activity or the second speech activity.

* * * * *